United States Patent [19]
Ryan

[11] Patent Number: 6,134,261
[45] Date of Patent: Oct. 17, 2000

[54] FDD FORWARD LINK BEAMFORMING METHOD FOR A FDD COMMUNICATIONS SYSTEM

[75] Inventor: David James Ryan, Seattle, Wash.

[73] Assignee: AT&T Wireless Svcs. Inc, Redmond, Wash.

[21] Appl. No.: 09/035,286

[22] Filed: Mar. 5, 1998

[51] Int. Cl.$^7$ ..................................................... H04K 1/10
[52] U.S. Cl. ......................... 375/141; 370/203; 370/343; 370/480; 455/517
[58] Field of Search ................................... 375/130, 133, 375/140, 141; 370/203, 343, 480; 455/517, 561, 562

[56] References Cited

U.S. PATENT DOCUMENTS

| | | | |
|---|---|---|---|
| 5,151,919 | 9/1992 | Dent | 370/209 |
| 5,914,981 | 6/1999 | Veintimilla | 375/145 |
| 5,923,700 | 7/1999 | Zhang | 375/141 |
| 5,933,421 | 8/1999 | Alamouti et al. | 370/330 |
| 5,987,338 | 11/1999 | Gibbons et al. | 455/574 |
| 5,991,279 | 11/1999 | Haugli et al. | 370/311 |
| 6,002,664 | 12/1999 | Schachter | 370/207 |
| 6,047,200 | 4/2000 | Gibbons et al. | 455/574 |

*Primary Examiner*—Young T. Tse

[57] ABSTRACT

A highly bandwidth-efficient communications method is disclosed, to maximize the signal-to-interference-noise ratio (SINR) of transmissions from a base station to a remote station in a wireless communications system. The method is used for base stations that have a plurality of antenna elements that are capable of spatial beam steering by altering the relative phase of transmission of signals from the respective elements. The method of the invention is based on providing calibration frames that sequentially transmit calibration bursts from the respective antenna elements for a particular destination remote station. The calibration bursts include a plurality of tone frequencies arranged in a distinctive orthogonal frequency division multiplexed pattern unique to the base station. The unique pattern enables a remote station to distinguish the base station's bursts from other signals present in a crowded area. The distinctive orthogonal frequency division multiplexed pattern can be a Hadamard code pattern, for example. The plurality of calibration bursts are part of a transmission frame having a reference phase. The remote station receives the calibration bursts and measures values related to the relative phase difference between the calibration bursts and the reference phase. The remote station also measures the SINR of the received bursts. The measured values are then prepared as a sampling data message that is transmitted by the remote station back to the base station. The base station then calculates therefrom a beam steering correction to modify the relative phase difference. This beam steering correction is then applied to traffic bursts that are respectively transmitted from the plurality of antenna elements at the base station, to steer the plurality of traffic bursts toward the remote station. The beam steering correction steers the traffic bursts to maximize the signal-to-interference-noise ratio (SINR) of the traffic bursts at the remote station.

30 Claims, 10 Drawing Sheets

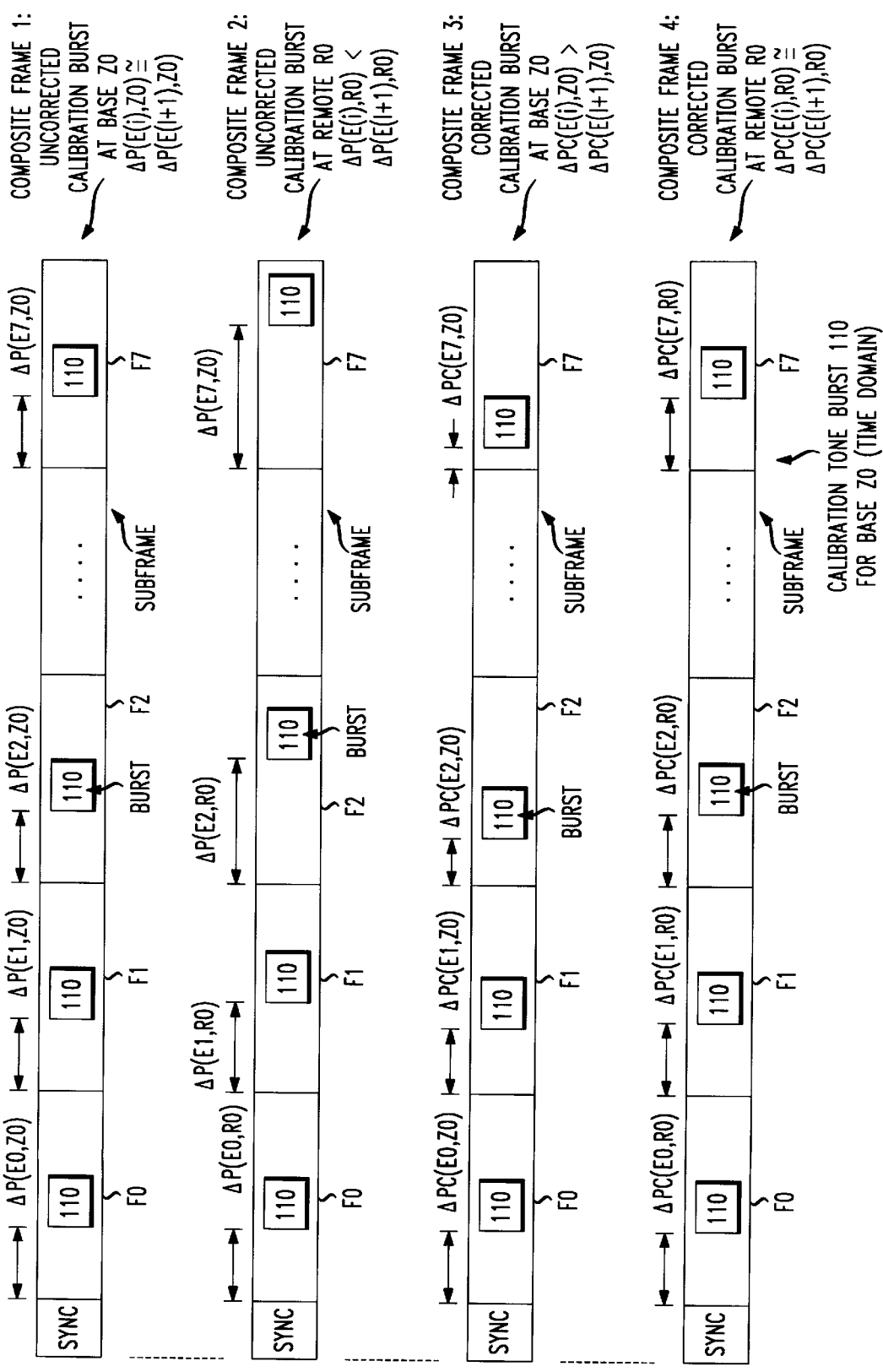

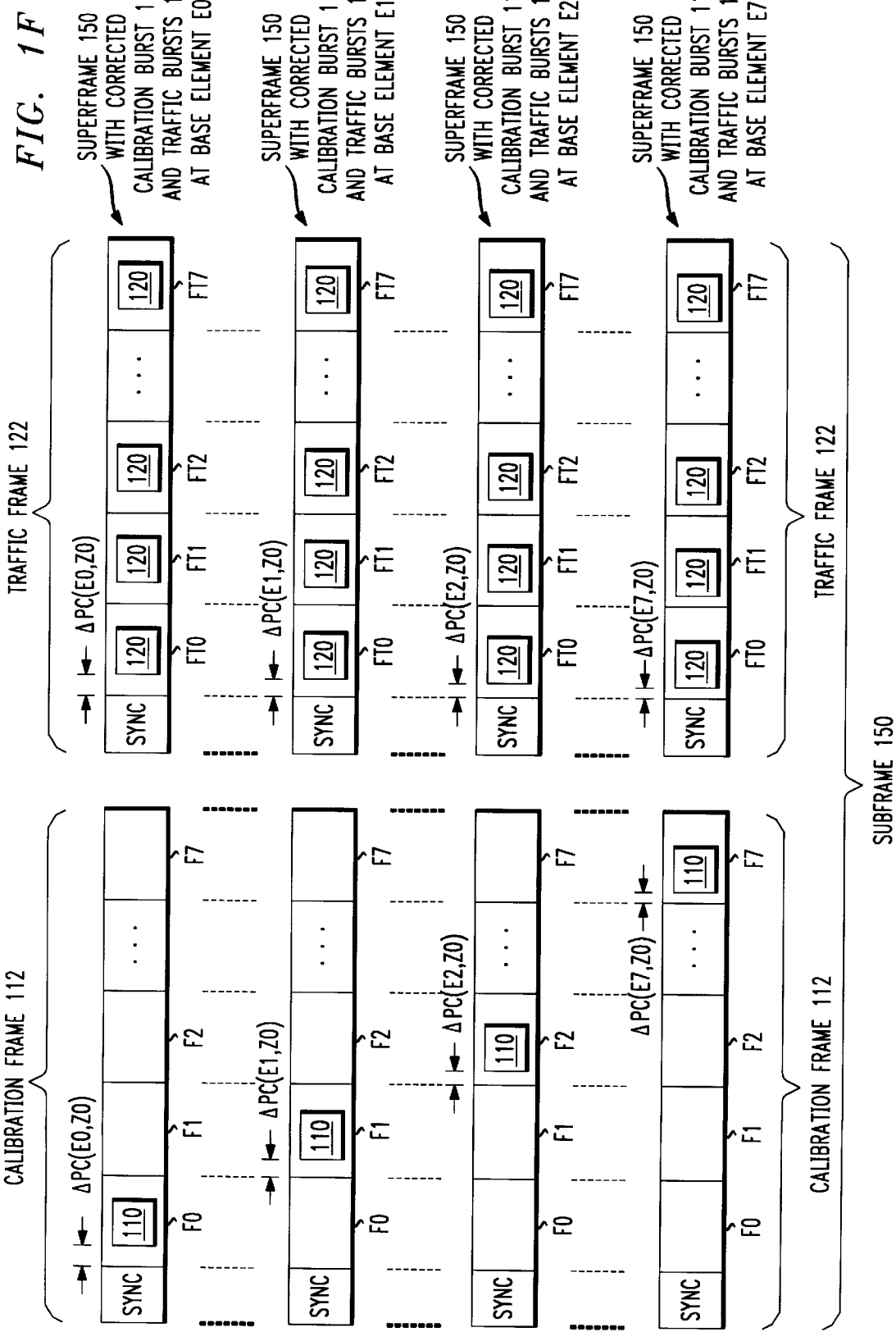

FDD FORWARD LINK BEAMFORMING METHOD FOR A FDD COMMUNICATIONS SYSTEM

CROSS-REFERENCES TO RELATED APPLICATIONS

The invention disclosed herein is related to the copending US patent application by Dave Gibbons, Bob Maxwell, Dave Ryan entitled "OUT OF CHANNEL CYCLIC REDUNDANCY CODE METHOD FOR A DISCRETE MULTITONE SPREAD SPECTRUM COMMUNICATIONS SYSTEM", Ser. No. 08/803,831, filed Feb. 24, 1997, assigned to AT&T Wireless Services, and incorporated herein by reference.

The invention disclosed herein is related to the copending US patent application by Siavash Alamouti, Doug Stolarz, and Joel Becker, entitled "VERTICAL ADAPTIVE ANTENNA ARRAY FOR A DISCRETE MULTITONE SPREAD SPECTRUM COMMUNICATIONS SYSTEM", Ser. No. 08/806,510, filed on the same day as the instant patent application, now abandoned for continuation application Ser. No. 08/937,654, assigned to AT&T Wireless Services, and incorporated herein by reference.

The invention disclosed herein is related to the US patent application by Alamouti, et al., entitled "Method for Frequency Division Duplex Communications", Ser. No. 08/796,584, filed on Feb. 6, 1997, now U.S. Pat. No. 5,933,421, assigned to AT&T Wireless Services, and incorporated herein by reference.

BACKGROUND OF THE INVENTION

1. Field of the Invention

This invention involves improvements to communications systems and methods in a wireless communications system.

2. Description of Related Art

Adaptive beamforming technology has become a promising technology for wireless service providers to offer large coverage, high capacity, and high quality service. Based on this technology, a wireless communication system can improve its coverage capability, system capacity, and performance significantly.

The personal wireless access network (PWAN) system described in the referenced Alamouti, Stolarz, et al. patent applications, uses adaptive beamforming combined with a form of the CDMA protocol known as discrete multitone spread spectrum (DMT-SS) to provide efficient communications between a base station and a plurality of remote units (RU).

What is needed is an improved method to maximize the signal-to-interference-noise ratio (SINR) of transmissions from a base station to a remote station in a wireless communications system.

SUMMARY OF THE INVENTION

A highly bandwidth-efficient communications method is disclosed, to maximize the signal-to-interference-noise ratio (SINR) of transmissions from a base station to a remote station in a wireless communications system. The method is used for base stations that have a plurality of antenna elements that are capable of spatial beam steering by altering the relative phase of transmission for signals from the respective elements. The method of the invention is based on providing calibration frames that sequentially transmit calibration bursts from the respective antenna elements for a particular destination remote station. The calibration bursts include a plurality of calibration tone frequencies arranged in a distinctive orthogonal frequency division multiplexed pattern unique to the base station. The unique pattern enables a remote station to distinguish the base station's bursts from other signals present in a crowded area. The distinctive orthogonal frequency division multiplexed pattern can be a Hadamard code pattern, for example. The base station forms each respective calibration burst for each antenna element by computing spreading weights to spread an outgoing calibration signal over the plurality of outgoing calibration tone frequencies, using the distinctive Hadamard orthogonal frequency division multiplexed pattern. Each antenna element, in turn, transmits its respective calibration burst in the form of a spread signal comprising the calibration signal spread over the plurality of calibration tone frequencies. The plurality of calibration bursts are part of a transmission frame having a reference phase.

The remote station receives the calibration bursts and despreads the spread signal by using despreading weights. The remote station measures values related to the relative phase difference between the calibration bursts and the reference phase. The remote station also measures the SINR of the received bursts. The measured values are then prepared as a sampling data message that is transmitted by the remote station back to the base station.

The base station receives the sampling data message and calculates therefrom a beam steering correction to modify the relative phase difference. This beam steering correction is then applied to traffic bursts that are respectively transmitted from the plurality of antenna elements at the base station, to steer the plurality of traffic bursts toward the remote station. The beam steering correction steers the traffic bursts to maximize the signal-to-interference-noise ratio (SINR) of the traffic bursts at the remote station.

The sampling data message that is received by the base station is in the form of a spread signal comprising an incoming link control signal that includes the sampling data message values spread over a plurality of incoming link control frequencies. The base station adaptively despreads the spread signal by using despreading weights, recovering the sampling data message values. The base station then derives from the received values, the current relative phase difference (at the remote station) between the respective of calibration bursts and the reference phase of the transmit frame. The base station then compares the current derived relative phase difference with a previous value of the relative phase difference that was derived from a prior measurement at the remote, of an earlier calibration burst. The prior measurement had resulted from beam steering corrections that were applied at the base station to the earlier calibration burst. The base station then calculates a transmission phase correction to the plurality of antenna elements in response to the comparing step, to minimize the relative phase differences between the plurality of traffic bursts at the remote station.

The base station then computes spreading weights to spread outgoing traffic signals over a plurality of outgoing frequencies, using the calculated transmission phase correction. The base station spreads the traffic signals over the plurality of outgoing frequencies using the computed spreading weights, thereby forming the plurality of outgoing traffic bursts. The resulting traffic bursts are transmitted from the plurality of antenna elements. In a preferred embodiment, the base station is part of a wireless discrete multitone spread spectrum communications system. In another aspect of the invention, the calibration tone frequencies in the calibration bursts are also used for link control in the traffic bursts.

Currently, the invention has advantageous applications in the field of wireless communications, such as cellular communications or personal communications, where bandwidth is scarce compared to the number of the users and their needs. Such applications may be effected in mobile, fixed, or minimally mobile systems. However, the invention may be advantageously applied to other, non-wireless, communications systems as well.

BRIEF DESCRIPTION OF THE DRAWINGS

In the drawings:

FIG. 1D shows four stages of the composite calibration frame: frame 1 has uncorrected calibration bursts as seen at the base station; frame 2 has uncorrected calibration bursts as seen at the remote station R0; frame 3 has corrected calibration bursts as seen at the base station; and frame 4 has corrected calibration bursts as seen at the remote station R0.

FIG. 1F shows the superframe 150 as it appears at each respective one of eight antenna elements at the base station, each superframe consisting of a calibration frame with one of the sequence of calibration bursts, and also one or more traffic frames with a plurality of traffic bursts. The base station adjusts the relative phases of the traffic bursts transmitted by a particular element to be the same as the relative phase of the calibration burst transmitted from that element.

DISCUSSION OF THE PREFERRED EMBODIMENT

Figure 1:
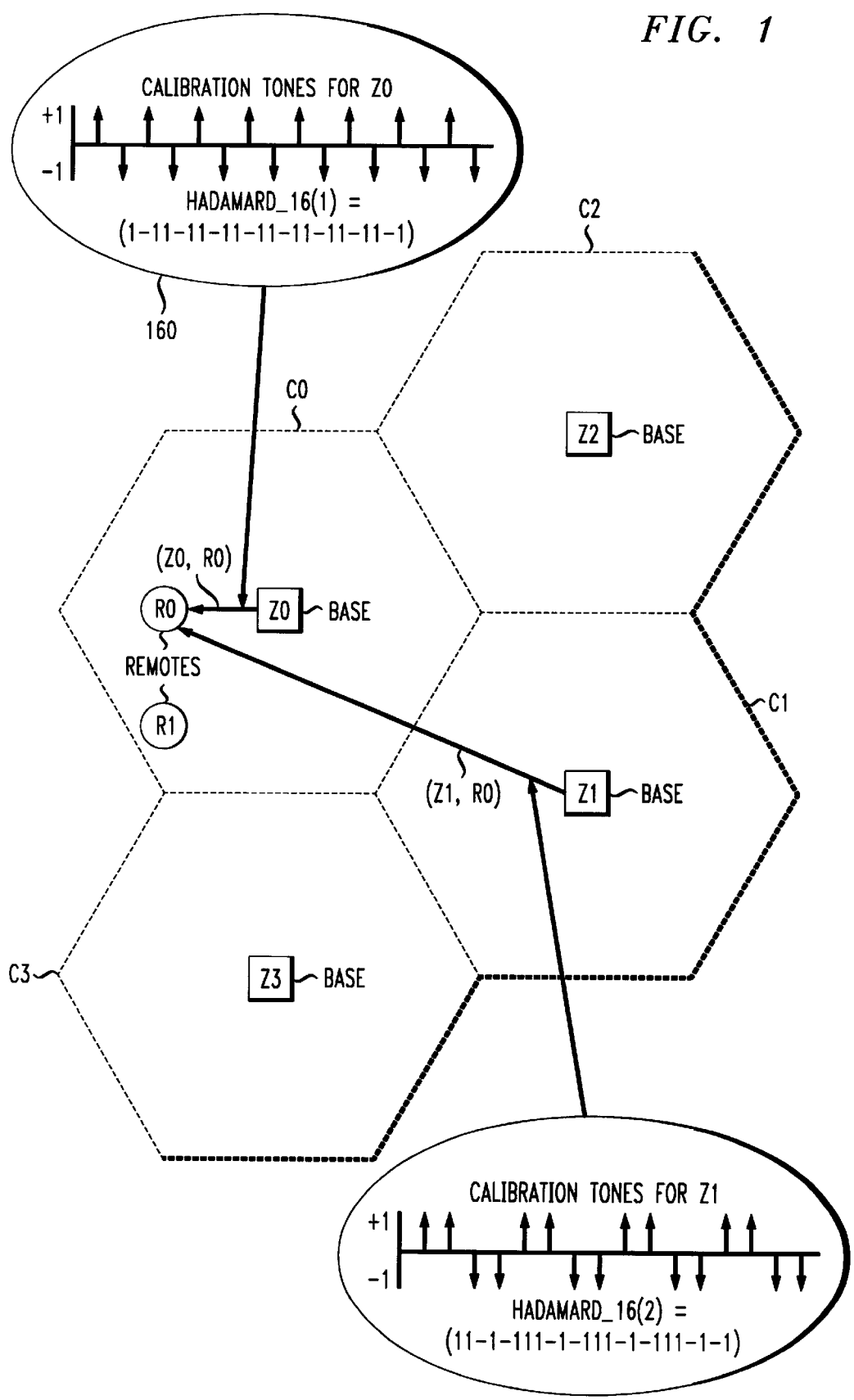
FIG. 1 illustrates a multiple cell wireless communications network, where each cell includes a base station that has a distinctive calibration tone pattern assigned to it.
Figure 1A:
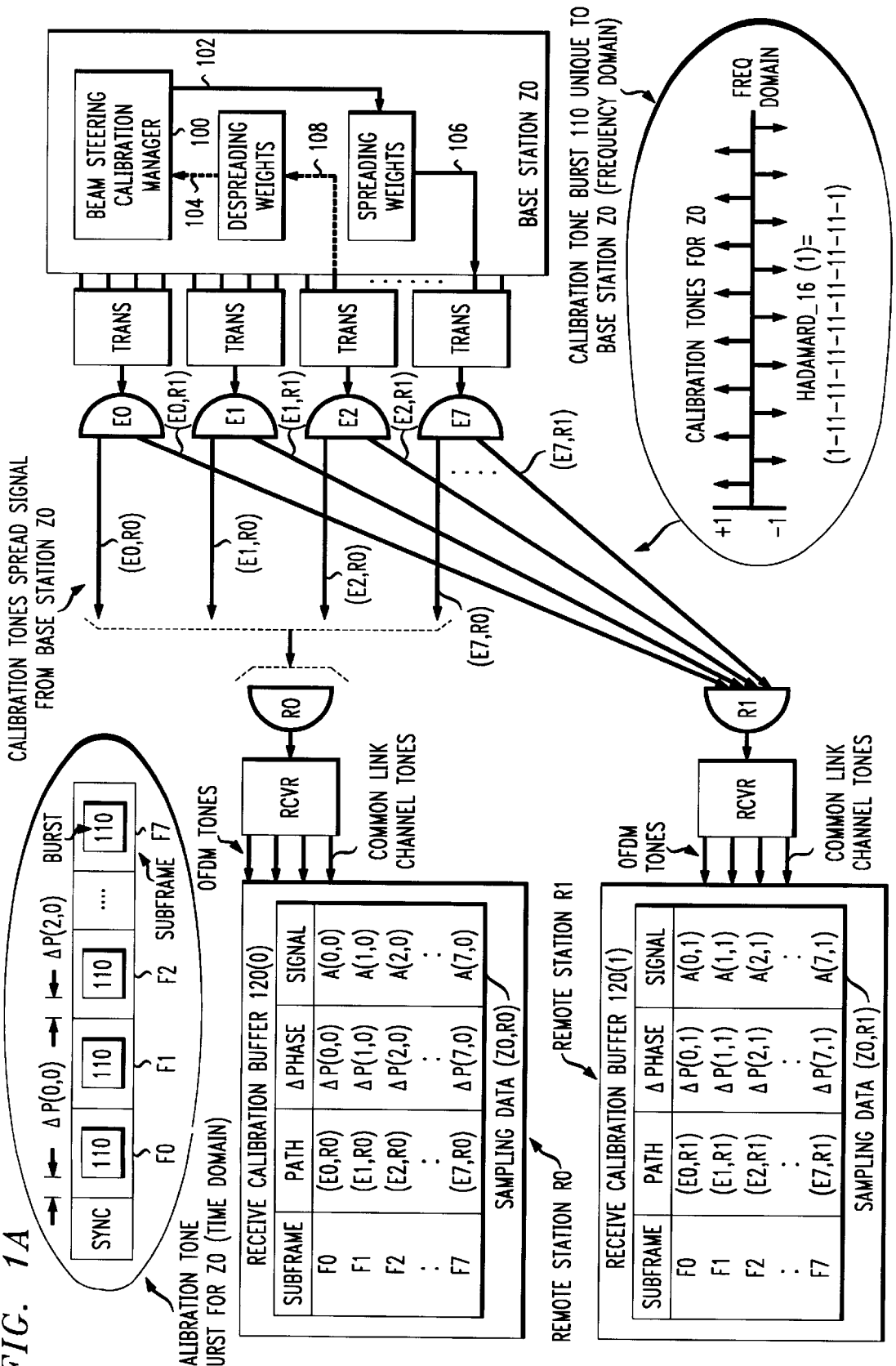
FIG. 1A shows base station Z0 sequentially transmitting a calibration burst in each of a plurality of subframes, from each of a plurality of antenna elements, each burst consisting of a plurality of tones in a distinctive orthogonal frequency division multiplex (OFDM) pattern. Two remote stations, R0 and R1, receive the calibration bursts and record the relative phase and the SINR of each burst as sampling data.
Figure 1B:
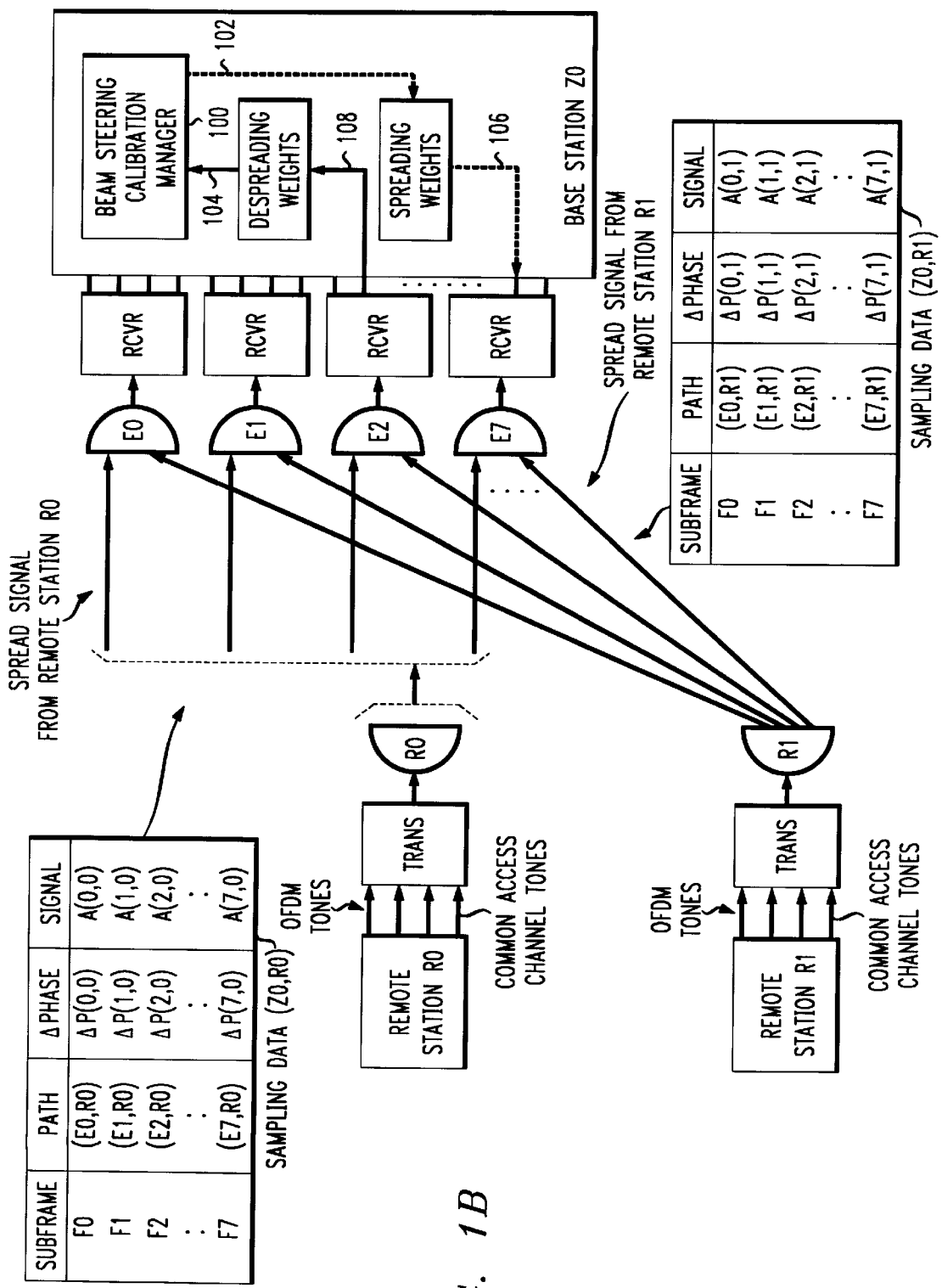
FIG. 1B shows each remote station R0 and R1 returning the sampling data to the base station.
Figure 1C:
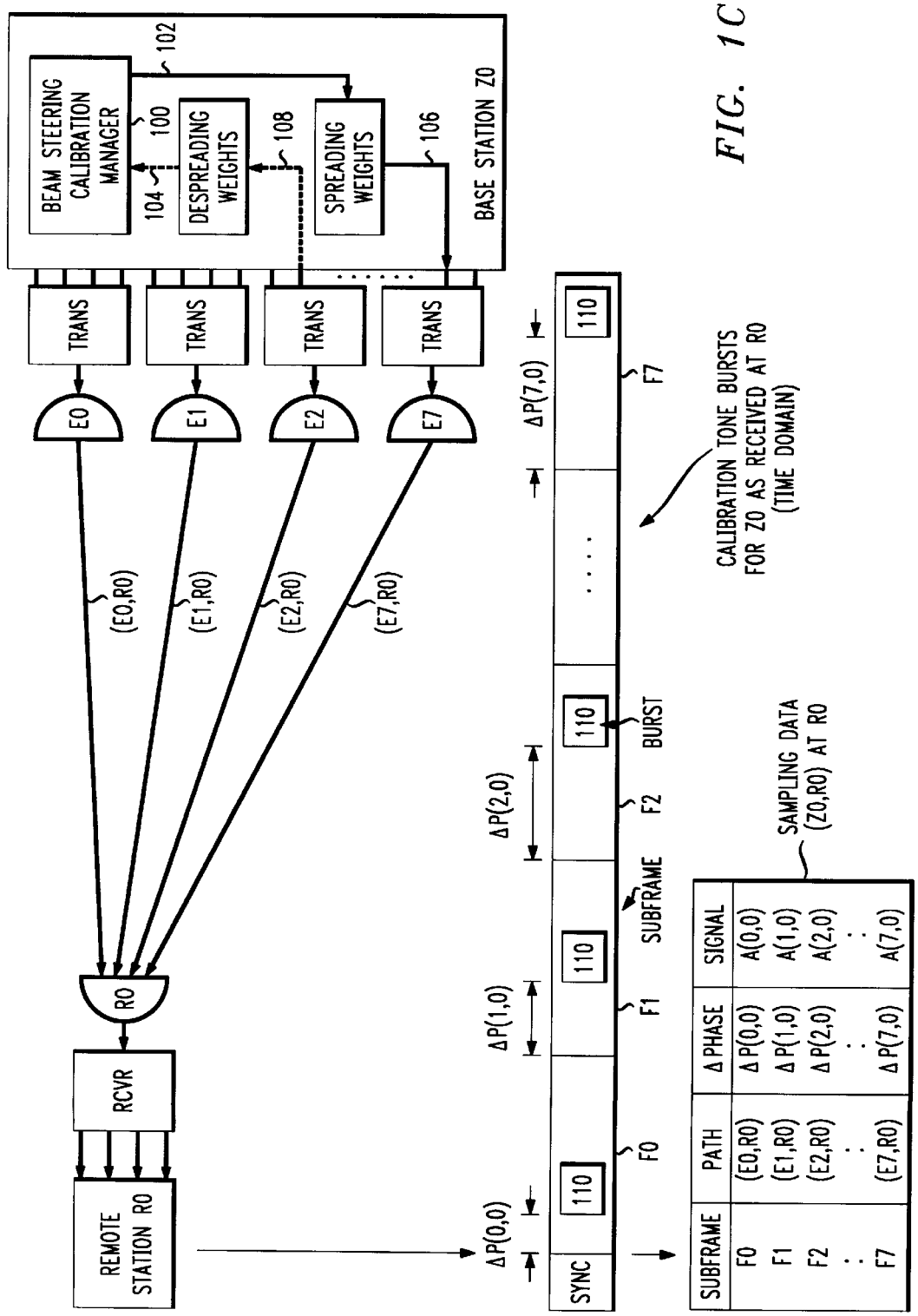
FIG. 1C shows a more detailed view of the composite calibration frame as it is received at the remote station R0, with each respective calibration burst positioned, with an uncorrected phase, in its respective subframe.
Figure 1E:
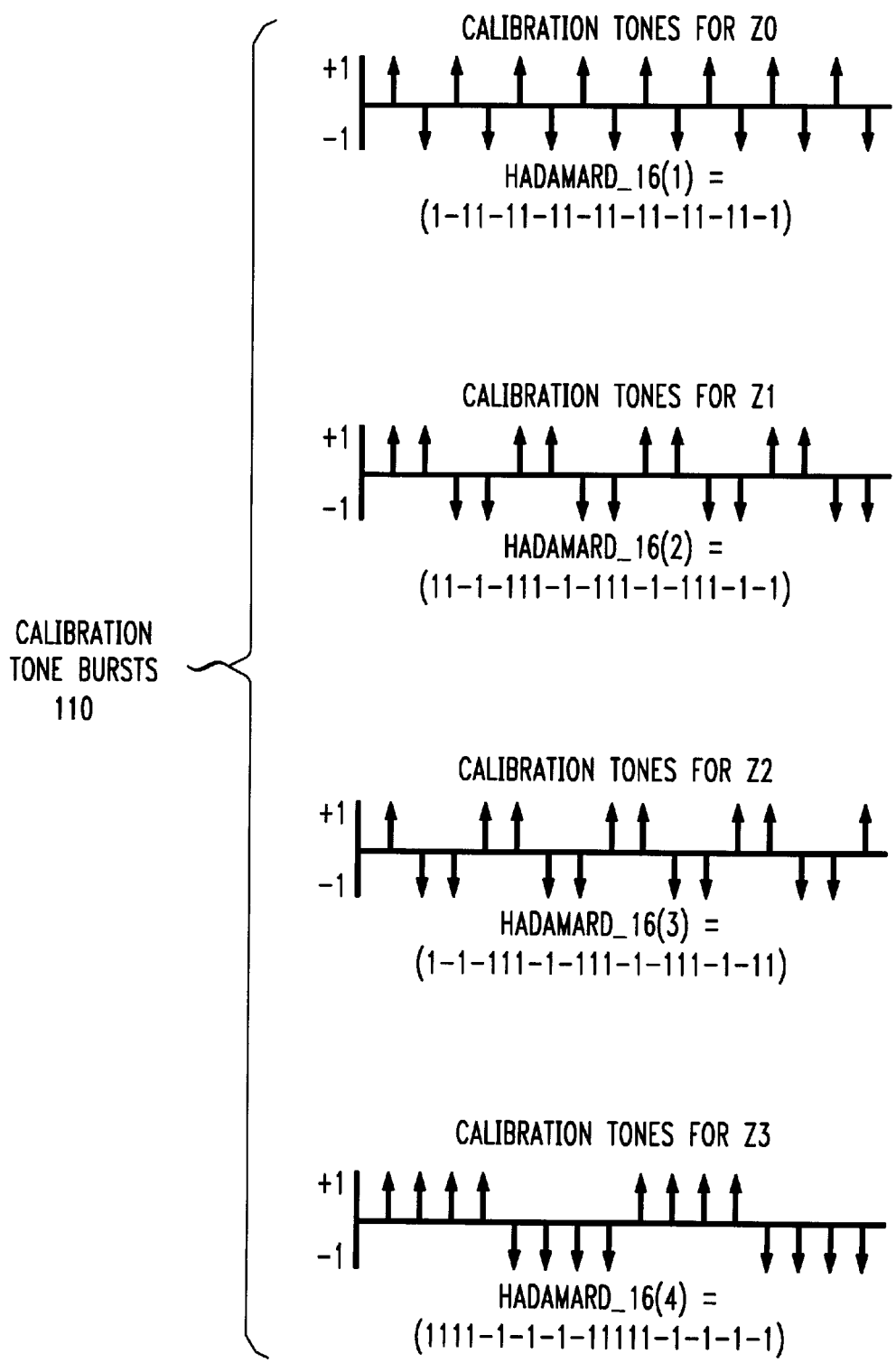
FIG. 1E shows four examples of the distinctive OFDM pattern provided by the Hadamard code for each of four base stations.

A highly bandwidth-efficient communications method is disclosed, to maximize the signal-to-interference-noise ratio (SINR) of transmissions from a base station to a remote station in a wireless communications network. FIG. 1 illustrates a multiple cell wireless communications network, where each cell C0, C1, C2, C3 includes a respective base station Z0, Z1, Z2, Z3 that has a distinctive calibration tone pattern assigned to it. FIG. 1E shows four examples, in the frequency domain, of distinctive orthogonal frequency division multiplex (OFDM) tone patterns H_16[1], H_16[2], H_16[3], and H_16[4], in the calibration bursts 110 provided by the Hadamard code for each of four respective base stations, Z0, Z1, Z2, Z3. In FIG. 1, cell C0 includes base station Z0 and remote stations R0 and R1. The adjacent cell C1 includes base station Z1. In a given interval, base station Z0 is shown sending an OFDM calibration tone pattern signal over path [Z0,R0] to remote station R0, encoded with the Hadamard code pattern H_16[1]=[1-11-11-11-11-11-11-11-1]. During the same interval, adjacent base station Z1 is shown sending an interfering OFDM calibration tone pattern signal which is unintentionally transmitted over path [Z1,R0] to remote station R0, encoded with the different Hadamard code pattern H_16[2]=[11-1-11 1-1-111-1-111-1-1]. The remote station R0 receives both calibration tone pattern signals from Z0 and Z1, but because of their distinctive OFDM coding, the remote station R0 selects only the H_16[1] calibration tone pattern signal from base station Z0 for carrying out the calibration method described below. In the figures herein, transmission paths are designated by the symbol "[X, Y]", where "X" is the source along the path and "Y" is the destination along the path.

The method is used for base stations that have a plurality of antenna elements that are capable of spatial beam steering by altering the relative phase of transmission for signals from the respective elements. FIG. 1A shows base station Z0 with eight antenna elements E0, E1, E2, to E7, for sequentially transmitting a calibration burst 110 in each of a plurality of subframes F0, F1, F2, to F7, from each of the plurality of antenna elements. The figure shows each calibration tone burst 110 consisting of a plurality of tones in a distinctive OFDM pattern. Two remote stations, R0 and R1, receive the calibration bursts and record the relative phase and the SINR of each burst as sampling data in a receive calibration buffer 120. The calibration tone burst 110 with the Hadamard code pattern H_16[1] which is unique to base station Z0, is shown in the frequency domain and in the time domain. The time domain depiction places each burst 110 from its respective antenna element E0, E1, E2, to E7 in its corresponding subframe F0, F1, F2, to F7. The eight subframes F0, F1, F2, to F7 are sequentially arranged in the composite calibration frame 122 shown in greater detail in FIG. 1F. The beginning of the calibration frame is marked with the SYNC header that establishes a reference phase for all of the subframes F0, F1, F2, to F7 and their respective calibration tone bursts 110.

The method of the invention is based on providing calibration frames that sequentially transmit calibration bursts from the respective antenna elements for a particular destination remote station. FIG. 1C shows a more detailed view of the composite calibration frame as it is received at the remote station R0, with each respective calibration burst 110 positioned, with an uncorrected phase, in its respective subframe F0, F1, F2, to F7. The "SYNC" header of the calibration frame in the figure is the reference phase for the frame. Each subframe is referenced with respect to the "SYNC" header. Each calibration burst 110 has a relative phase difference with respect to the reference phase by an amount that is proportional to the path distance from the respective transmitting antenna element E0, E1, E2, to E7 at the base station Z0 to the receiving remote station R0.

The calibration bursts include a plurality of calibration tone frequencies arranged in a distinctive orthogonal frequency division multiplexed pattern unique to the base station, as shown in FIG. 1E. The unique pattern enables a remote station to distinguish the base station's bursts from other signals present in a crowded area, such as shown in FIG. 1.

The distinctive orthogonal frequency division multiplexed pattern can be a Hadamard code pattern, for example, as shown in FIG. 1E. Hadamard codes are obtained by selecting as codewords the rows of a Hadamard matrix. A Hadamard matrix "A" is a N×N matrix of binary valued elements such that each row differs from any other row in exactly N/2 locations. One row contains all minus ones with the remainder containing N/2 minus ones and N/2 plus ones. The minimum distance for these codes, that is the number of elements in which any two code words differ, is N/2. Other orthogonal frequency division multiplexed patterns can be used, such as Golay codes or Reed-Solomon codes, which have a sufficient minimum distance to enable the calibration burst 110 from each base station within the reception range of a remote station, to be uniquely encoded. A discussion of minimum distance codes can be found in the book by Rappaport, "Wireless Communications", Prentice Hall, 1996. The distinctive orthogonal frequency division multiplexed patterns of the calibration bursts 110 shown in FIG. 1E, are depicted as patterns of vertical arrows along the ordinate, arrayed along the frequency dimension of the abscissa. The ordinate is the binary value "+1" or "−1" of a respective frequency tone, that is modulated in a binary phase shift keying (BPSK) or a quadrature phase shift keying (QPSK) modulation technique. The frequency tones of the calibration bursts 110 can also be modulated in a higher order M-ary phase shift keying (MPSK) modulation technique. These modulation techniques are described in greater detail in the book by Rappaport, "Wireless Communications", Prentice Hall, 1996.

The base station forms each respective calibration burst for each antenna element using spread spectrum modulation techniques, by computing spreading weights to spread an outgoing calibration signal over the plurality of outgoing calibration tone frequencies in the calibration burst 110, using the distinctive Hadamard orthogonal frequency division multiplexed pattern. The calibration burst 110 is then demodulated at the remote station's receiver by crosscorrelation with the Hadamard code that is unique to the transmitting base station. The process of spread spectrum modulation and demodulation is described in the above referenced Alamouti, Stolarz, et al. patent application which is incorporated herein by reference.

Each antenna element E0, E1, E2, to E7 of the base station Z0, in turn, transmits its respective calibration burst 110 in the form of a spread signal comprising the calibration signal spread over the plurality of calibration tone frequencies.

The plurality of calibration bursts are part of a transmission frame 112 having a reference phase. FIG. 1D shows four stages of the composite calibration frame 112: frame 1 has uncorrected calibration bursts 110 as seen at the base station Z0; frame 2 has uncorrected calibration bursts 110 as seen at the remote station R0; frame 3 has corrected calibration bursts 110 as seen at the base station Z0; and frame 4 has corrected calibration bursts 110 as seen at the remote station R0.

The remote station R0 receives the calibration bursts 110 in FIG. 1C and despreads the spread signal by using despreading weights. This process is described in the above referenced Alamouti, Stolarz, et al. patent application which is incorporated herein by reference. The remote station R0 measures values related to the relative phase difference between the calibration bursts 110 and the SYNC reference phase. The remote station R0 also measures the SINR of the received bursts 110. The measured values are then prepared as a sampling data message shown in FIG. 1B, that is transmitted by the remote station R0 back to the base station Z0. FIG. 1B shows each remote station R0 and R1 returning their respective sampling data messages to the base station Z0.

For example: The remote station R0 despreads the calibration burst 110 with the appropriate Hadamad matrix column:

ex: $H_{16}(1) = +1 -1 +1 -1 +1 -1 +1 -1 \ldots 1$ $$\text{Signal} = \frac{1}{16} \int s \times H_{16}(1)$$

$$SINR \approx 10\log_{10}\left(\sqrt{I^2 + Q^2}\right)$$

$$\text{phase} = \tan^{-1}\left(\frac{Q}{I}\right)$$

Yielding a signal complex value $I_1$, $Q_1$, where Q and I are the axes of a two dimensional constellation diagram depicting a QPSK modulated signal. Additional discussion of QPSK modulation can be found in the book by Rappaport, "Wireless Communications", Prentice Hall, 1996.

As an alternative, the remote station R0 can measure absolute phase information in case the SINR of antenna element E0 is too low, thereby allowing the base Z0 to reference the phase to the strongest signal measured by the remote station R0.

The remote station R0 the performs the same steps on all eight of the calibration subframes received and converts the phase measurement to be with respect to the SYNC header at the beginning of the calibration frame, thereby forming the following vectors:

SINR=$[S_1, S_2, S_3, S_4, S_5, S_6, S_7, S_8]$

Phase=$[0, P_2, P_3, P_4, P_5, P_6, P_7, P_8]$ when $P_N$=phase$_n$−phase$_1$

In FIG. 1B, the remote station R0 the sends the sampling data back to the base station Z0 as magnitude and phase vectors in a common access channel (CAC) message during:

Call Request—for remote station originated calls

Call Setup Response—for remote station terminated calls

Ping Response—for a remote station status request by base Z0

The Base Z0 then uses this data to:

1) Directly beamform the signal to a given remote station by adding spreading weights to maximize the signal received by the remote station.
2) Beamform the signal received by the base station from the remote station R0 and simultaneously cancel signals received from other remote stations R1 in the same cell C0 that represent interference, by optimizing the sampling data collected from the multiple remote stations R0 and R1 on a given common access channel (CAC).
3) Calibrate the base antenna array E0, E1, E2, to E7 by collecting phase and amplitude information from multiple remote stations R0 and R1 and combing this with the known latitude and longitude of the base Z0 and the remote stations R0 and R1 to correct for analog electronics errors, array positioning error and effects of channel distortion. This enables the accurate steering of the beam to each respective remote station. It also enables accurate omnicasting transmissions to all of the remote stations.

4) The optimized channel characteristics established by this method at the base station Z0 in the forward channel (transmissions from the base to the remote station) can also be transferred to the respective remote stations to enable optimized reverse channel characteristics (transmissions from the remote station back to the base station) for true retrodirective beam forming.

The base station receives the sampling data message in FIG. 1B and calculates therefrom a beam steering correction to modify the relative phase difference. The receivers (RCVR) at the base station pass the received signal from the antenna elements E0, E1, E2, to E7 over line 108 to the despreading weights, and the resulting despread sampling data message is passed over line 104 to the beam steering calibration manager 100. This beam steering correction is then applied to traffic bursts 120 in FIG. 1F, that are respectively transmitted from the plurality of antenna elements E0, E1, E2, to E7 at the base station Z0, to steer the plurality of traffic bursts 120 toward the remote station R0. The beam steering correction steers the traffic bursts 120 to maximize the signal-to-interference-noise ratio (SINR) of the traffic bursts at the remote station R0. FIG. 1F shows the superframe 150 as it appears at each respective one of eight antenna elements E0, E1, E2, to E7 at the base station Z0, each superframe 150 consisting of a calibration frame 112 with one of the sequence of calibration bursts 110, and also one or more traffic frames 122 with a plurality of traffic bursts 120. The base station Z0 adjusts the relative phases of the traffic bursts 120 transmitted by a particular element E0, E1, E2, to E7 to be the same as the relative phase of the calibration burst 110 transmitted from that respective antenna element.

The sampling data message of FIG. 1B, that is received by the base station Z0 is in the form of a spread signal comprising an incoming link control signal, the common access channel (CAC), that includes the sampling data message values spread over a plurality of incoming link control frequencies. The base station Z0 adaptively despreads the spread signal by using despreading weights, recovering the sampling data message values. This process is described in the above referenced Alamouti, Stolarz, et al. patent application which is incorporated herein by reference. The base station Z0 then derives from the received values, the current relative phase difference (as measured at the remote station) between the respective of calibration bursts 110 and the reference phase SYNC of the transmitted calibration frame 112. The beam steering calibration manager 100 at the base station Z0 then compares the current derived relative phase difference with a previous value of the relative phase difference that was derived from a prior measurement at the remote station R0, of an earlier calibration burst 110. The prior measurement had resulted from beam steering corrections that were applied at the base station Z0 to the earlier calibration burst. The beam steering calibration manager 100 at the base station then calculates a transmission phase correction to the plurality of antenna elements E0, E1, E2, to E7 in response to the comparing step, to minimize the relative phase differences between the plurality of traffic bursts 120 at the remote station R0. Referring to FIG. 1C and FIG. 1F, the relative phase difference between the traffic burst 120 in traffic subframe FT0 along path [E0,R0] from antenna element E0 to R0, relative to the traffic burst 120 in traffic subframe FT0 along path [E7,R0] from antenna element E1 to R0, is proportional to the difference Δd between the path lengths:

Relative phase difference is proportional to $$\left(2\pi \frac{\Delta d}{h}\right).$$

The beam steering calibration manager 100 at the base station base Z0 can maximize the SINR of the traffic bursts 120 transmitted to the remote station R0 by applying spreading weights minimize the relative phase difference between the traffic burst 120 in traffic subframe FT0 along path [E0,R0] from antenna element E0 to R0, relative to the traffic burst 120 in traffic subframe FT0 along path [E7,R0] from antenna element E1 to R0. This is the calculated transmission phase correction The base station then computes spreading weights to spread outgoing traffic signals over a plurality of outgoing frequencies, using the calculated transmission phase correction. This process is described in the above referenced Alamouti, Stolarz, et al. patent application which is incorporated herein by reference. The base station spreads the traffic signals over the plurality of outgoing frequencies using the computed spreading weights, thereby forming the plurality of outgoing traffic bursts. The resulting traffic bursts 120 are transmitted from the plurality of antenna elements. In a preferred embodiment, the base station is part of a wireless discrete multitone spread spectrum communications system.

Figure 1G:
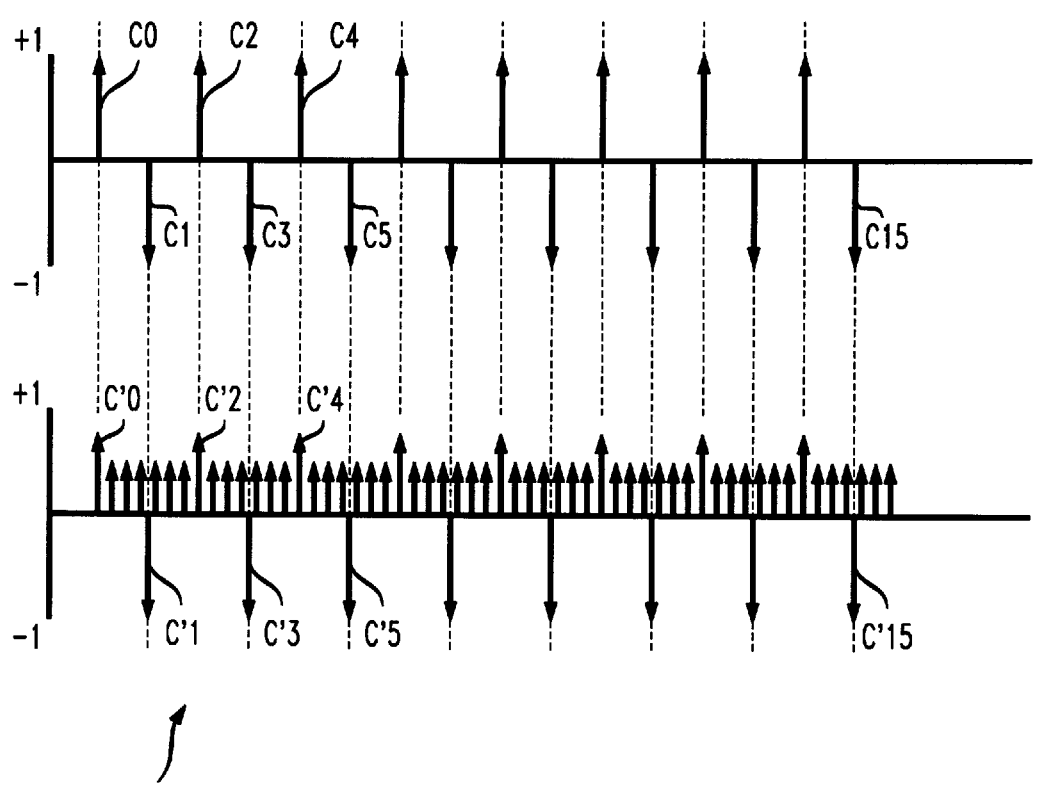
FIG. 1G illustrates the reuse of the tones used in the calibration burst for calibration, to also be used for call control functions in the traffic bursts.

In another aspect of the invention, the calibration tone frequencies in the calibration bursts are also used for link control in the traffic bursts. FIG. 1G illustrates the reuse of the tones C0, C1, C2, to C15 used in the calibration burst 110 for calibration, to also be used as the tones C'0, C'1, C'2, to C'15 for call control functions in the traffic bursts 120.

Figure 2:
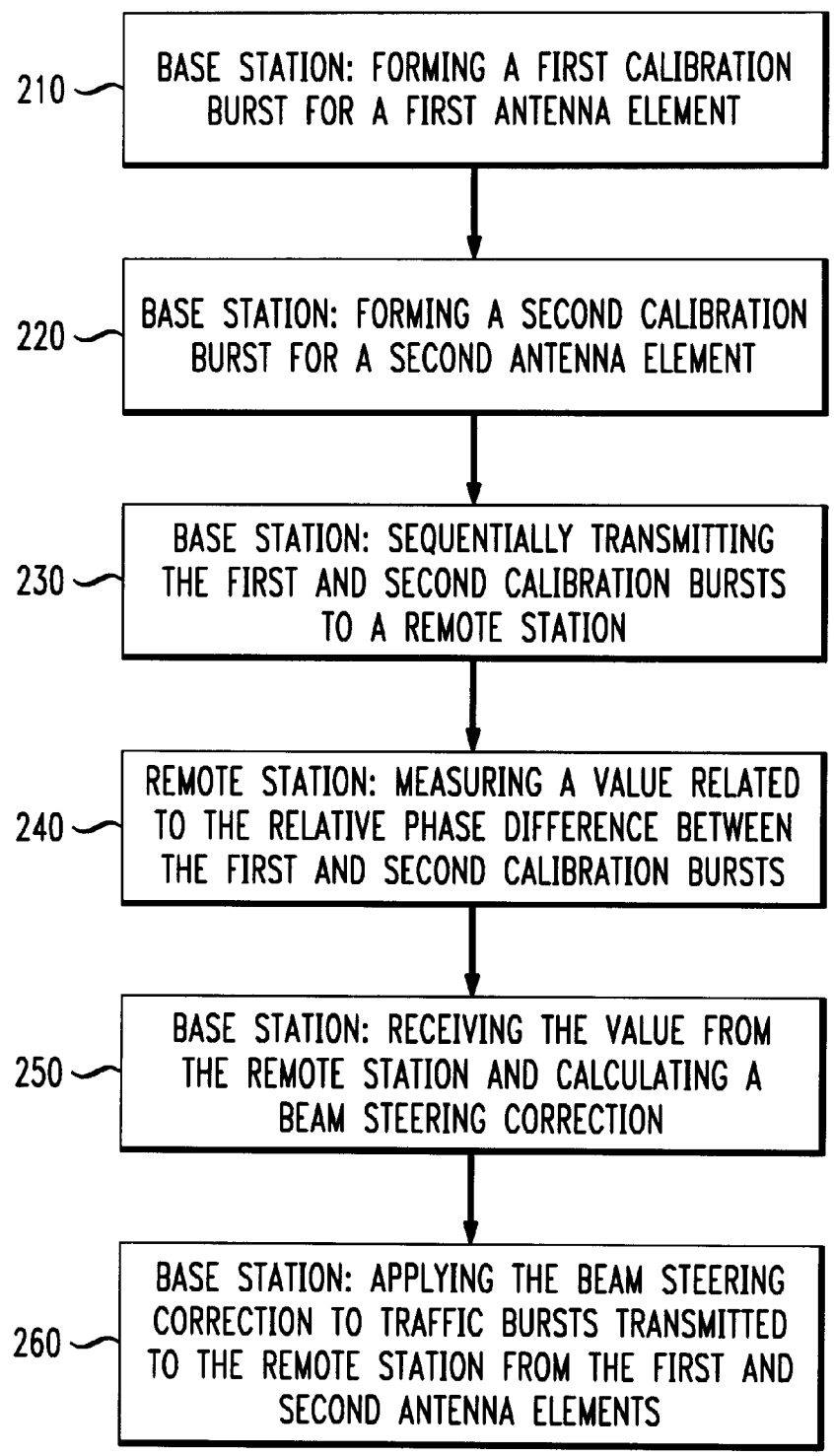
FIG. 2 is a flow diagram of the overall operation of the base station and remote station in accordance with the invention.

FIG. 2 is a flow diagram of the operation of the base station and remote station in accordance with the invention. The flow diagram of FIG. 2 begins with step 210, forming a first calibration burst at a first antenna element of a base station, including a plurality of tone frequencies arranged in a distinctive orthogonal frequency division multiplexed pattern unique to the base station. Then the method continues with step 220, forming a second calibration burst at a second antenna element of the base station, including the plurality of tone frequencies arranged in the pattern. Then the method continues with step 230, sequentially transmitting the first calibration burst from the first antenna element and the second calibration burst from the second antenna element. Then the method continues with step 240, receiving the first and second calibration bursts at a remote station and measuring a value related to a relative phase difference between therebetween. Then the method continues with step 250, transmitting the value back to the base station and calculating therefrom a beam steering correction at the base station to modify the relative phase difference. Then the method continues with step 260, applying the beam steering correction to first and second traffic bursts respectively transmitted from the first and second antenna elements at the base station to the remote station.

Figure 3:
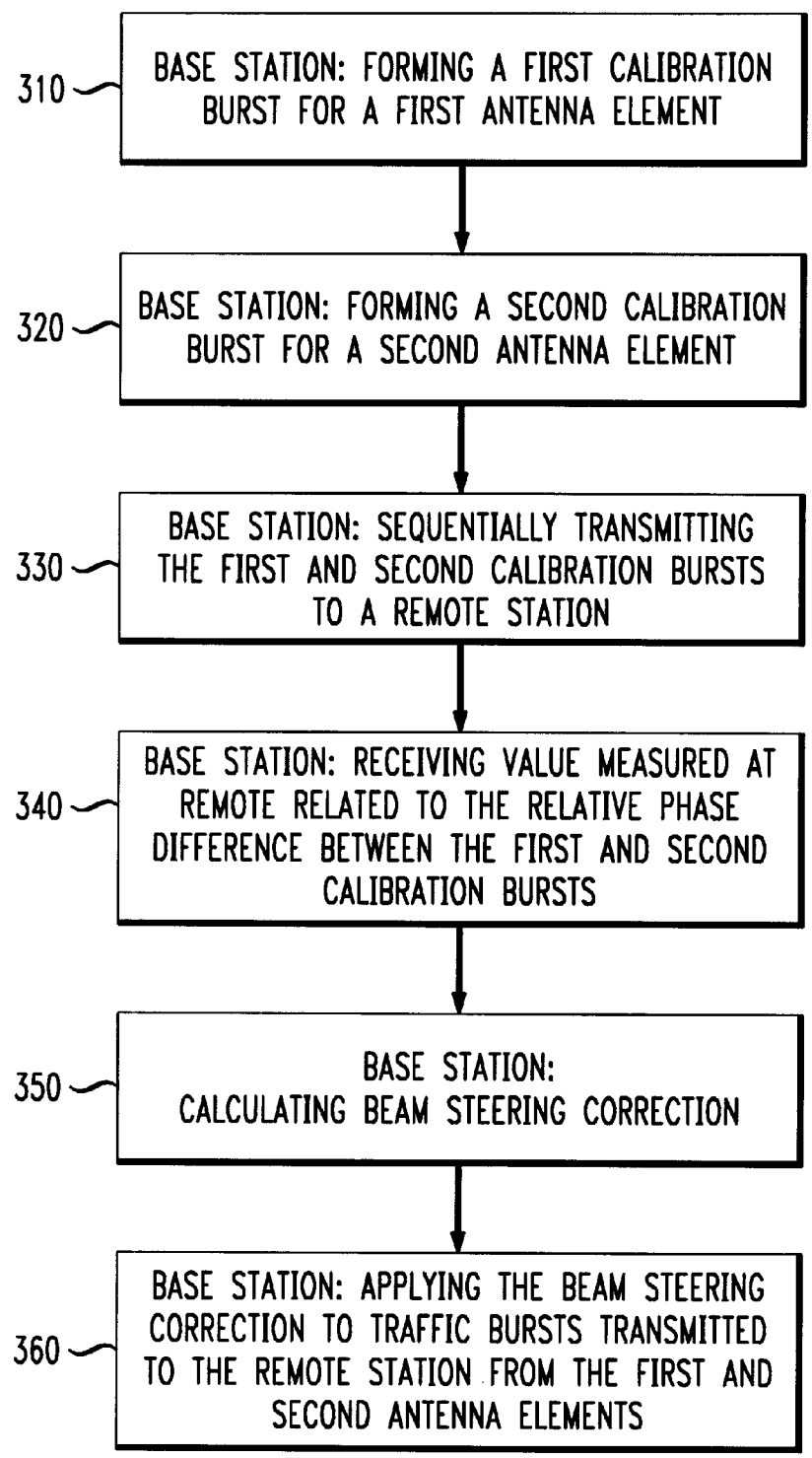
FIG. 3 is a flow diagram of the operation of the beam steering calibration manager in the base station.

FIG. 3 is a flow diagram of the operation of the beam steering calibration manager 100 in the base station Z0. The flow diagram of FIG. 3 begins with step 310, beam steering calibration manager 100 forming a first calibration burst 110 at a first antenna element E0 of base station Z0, including a plurality of tone frequencies arranged in the distinctive orthogonal frequency division multiplexed pattern unique to the base station Z0. FIG. 1A shows the path 102 from the beam steering calibration manager 100 to the spreading weights processor. The spreading weights processor forms each respective calibration burst for each antenna element by computing spreading weights to spread an outgoing calibration signal over the plurality of outgoing calibration tone frequencies, using the distinctive Hadamard orthogonal frequency division multiplexed pattern. Then the method continues with step 320, with the spreading weights processor forming a second calibration burst 110 at a second antenna element E1 of the base station Z0, including the plurality of tone frequencies arranged in the pattern.

Then the method continues with step 330, where the spreading weights processor passes the spread signal over path 106 to the respective transmitters of the antenna elements E0 and E1, for sequentially transmitting the first calibration burst from the first antenna element E0 and the second calibration burst from the second antenna element E1.

Then the method continues with step 340, where the base station Z0 receives from the remote station R0 the value measured at R0 related to the relative phase difference between the first calibration burst from the first antenna element E0 and the second calibration burst from the second antenna element E1. Then the method continues with step 350, with the beam steering calibration manager 100 calculating a beam steering correction at the base station to modify the relative phase difference. Then the method continues with step 360, with the beam steering calibration manager 100 applying the beam steering correction to first and second traffic bursts respectively transmitted from the first and second antenna elements at the base station to the remote station.

Although the preferred embodiments of the invention have been described in detail above, it will be apparent to those of ordinary skill in the art that obvious modifications may be made to the invention without departing from its spirit or essence. Consequently, the preceding description should be taken as illustrative and not restrictive, and the scope of the invention should be determined in view of the following claims.

What is claimed is:

1. A highly bandwidth-efficient communications method, comprising the steps of:
   forming a first calibration burst at a first antenna element of a base station, including a plurality of tone frequencies arranged in a distinctive orthogonal frequency division multiplexed pattern unique to said base station;
   forming a second calibration burst at a second antenna element of said base station, including said plurality of tone frequencies arranged in said pattern;
   sequentially transmitting said first calibration burst from said first antenna element and said second calibration burst from said second antenna element;
   receiving said first and second calibration bursts at a remote station and measuring a value related to a relative phase difference between therebetween;
   transmitting said value back to said base station and calculating therefrom a beam steering correction at said base station to modify said relative phase difference; and
   applying said beam steering correction to first and second traffic bursts respectively transmitted from said first and second antenna elements at said base station to said remote station.

2. The highly bandwidth-efficient communications method of claim 1, wherein said first and second calibration bursts are part of a transmission frame having a reference phase and said value includes a relative phase of said first and second calibration bursts with respect to said reference phase.

3. The highly bandwidth-efficient communications method of claim 1, wherein said value includes a signal-to-interference-noise ratio (SINR) of said first and second calibration bursts.

4. The highly bandwidth-efficient communications method of claim 1, wherein said beam steering correction at said base station steers said first and second traffic bursts respectively transmitted from said first and second antenna elements toward said remote station.

5. The highly bandwidth-efficient communications method of claim 1, wherein said beam steering correction at said base station steers said first and second traffic bursts respectively transmitted from said first and second antenna elements to maximize a signal-to-interference-noise ratio (SINR) of said first and second traffic bursts.

6. The highly bandwidth-efficient communications method of claim 1, wherein said step of forming said first calibration burst at said first antenna element comprises the steps of:
   selecting said distinctive orthogonal frequency division multiplexed pattern unique to said base station;
   computing spreading weights at said base station to spread an outgoing calibration signal over a plurality of outgoing frequencies, using said pattern; and
   spreading said calibration signal over said plurality of outgoing frequencies using said computed spreading weights, thereby forming said first calibration burst.

7. The highly bandwidth-efficient communications method of claim 1, wherein said step of calculating said beam steering correction at said base station comprises the steps of:
   receiving at said base station a spread signal comprising an incoming link control signal that includes said value spread over a plurality of incoming link control frequencies;
   adaptively despreading said spread signal received at the base station by using despreading weights, recovering said value;
   deriving from said value said relative phase difference measured between said first and second calibration bursts at said remote station;
   comparing said derived relative phase difference with a preceding derived relative phase difference measured between preceding first and second calibration bursts at said remote station resulting from a preceding beam steering correction applied at said base station to said preceding first and second calibration bursts;
   calculating a transmission phase correction to said first and second antenna elements in response to said comparing step, to minimize a relative phase difference between said first and second traffic bursts at said remote station.

8. The highly bandwidth-efficient communications method of claim 7, wherein said base station is part of a wireless discrete multitone spread spectrum communications system.

9. The highly bandwidth-efficient communications method of claim 7, wherein said calibration bursts are used for link control in said traffic bursts.

10. The highly bandwidth-efficient communications method of claim 7, wherein said step of applying said beam steering correction to said first and second traffic bursts further comprises the steps of:

computing spreading weights at said base station to spread traffic signals over a plurality of outgoing frequencies, using said calculated transmission phase correction; and spreading said traffic signals over said plurality of outgoing frequencies using said computed spreading weights, thereby forming said first and second traffic bursts.

11. A highly bandwidth-efficient communications method, comprising the steps of:

forming a first calibration burst at a first antenna element of a base station, including a plurality of tone frequencies arranged in a distinctive orthogonal frequency division multiplexed pattern unique to said base station;

forming a second calibration burst at a second antenna element of said base station, including said plurality of tone frequencies arranged in said pattern;

sequentially transmitting said first calibration burst from said first antenna element and said second calibration burst from said second antenna element;

receiving a value from a remote station, said value related to a relative phase difference between said first and second calibration bursts at said remote station;

calculating from said value a beam steering correction at said base station to modify said relative phase difference; and applying said beam steering correction to first and second traffic bursts respectively transmitted from said first and second antenna elements at said base station to said remote station.

12. The highly bandwidth-efficient communications method of claim 11, wherein said first and second calibration bursts are part of a transmission frame having a reference phase and said value includes a relative phase of said first and second calibration bursts with respect to said reference phase.

13. The highly bandwidth-efficient communications method of claim 11, wherein said value includes a signal-to-interference-noise ratio (SINR) of said first and second calibration bursts.

14. The highly bandwidth-efficient communications method of claim 11, wherein said beam steering correction at said base station steers said first and second traffic bursts respectively transmitted from said first and second antenna elements toward said remote station.

15. The highly bandwidth-efficient communications method of claim 11, wherein said beam steering correction at said base station steers said first and second traffic bursts respectively transmitted from said first and second antenna elements to maximize a signal-to-interference-noise ratio (SINR) of said first and second traffic bursts.

16. The highly bandwidth-efficient communications method of claim 11, wherein said step of forming said first calibration burst at said first antenna element comprises the steps of:

selecting said distinctive orthogonal frequency division multiplexed pattern unique to said base station;

computing spreading weights at said base station to spread an outgoing calibration signal over a plurality of outgoing frequencies, using said pattern; and spreading said calibration signal over said plurality of outgoing frequencies using said computed spreading weights, thereby forming said first calibration burst.

17. The highly bandwidth-efficient communications method of claim 11, wherein said step of calculating said beam steering correction at said base station comprises the steps of:

receiving at said base station a spread signal comprising an incoming link control signal that includes said value spread over a plurality of incoming link control frequencies;

adaptively despreading said spread signal received at the base station by using despreading weights, recovering said value;

deriving from said value said relative phase difference measured between said first and second calibration bursts at said remote station;

comparing said derived relative phase difference with a preceding derived relative phase difference measured between preceding first and second calibration bursts at said remote station resulting from a preceding beam steering correction applied at said base station to said preceding first and second calibration bursts;

calculating a transmission phase correction to said first and second antenna elements in response to said comparing step, to minimize a relative phase difference between said first and second traffic bursts at said remote station.

18. The highly bandwidth-efficient communications method of claim 17, wherein said base station is part of a wireless discrete multitone spread spectrum communications system.

19. The highly bandwidth-efficient communications method of claim 17, wherein said calibration bursts are used for link control in said traffic bursts.

20. The highly bandwidth-efficient communications method of claim 17, wherein said step of applying said beam steering correction to said first and second traffic bursts further comprises the steps of:

computing spreading weights at said base station to spread traffic signals over a plurality of outgoing frequencies, using said calculated transmission phase correction; and spreading said traffic signals over said plurality of outgoing frequencies using said computed spreading weights, thereby forming said first and second traffic bursts.

21. A highly bandwidth-efficient communications system, comprising:

means for forming a first calibration burst at a first antenna element of a base station, including a plurality of tone frequencies arranged in a distinctive orthogonal frequency division multiplexed pattern unique to said base station;

means for forming a second calibration burst at a second antenna element of said base station, including said plurality of tone frequencies arranged in said pattern;

means for sequentially transmitting said first calibration burst from said first antenna element and said second calibration burst from said second antenna element;

means for receiving a value from a remote station, said value related to a relative phase difference between said first and second calibration bursts at said remote station;

means for calculating from said value a beam steering correction at said base station to modify said relative phase difference; and means for applying said beam steering correction to first and second traffic bursts respectively transmitted from said first and second antenna elements at said base station to said remote station.

22. The highly bandwidth-efficient communications system of claim 21, wherein said first and second calibration bursts are part of a transmission frame having a reference phase and said value includes a relative phase of said first and second calibration bursts with respect to said reference phase.

23. The highly bandwidth-efficient communications system of claim 21, wherein said value includes a signal-to-interference-noise ratio (SINR) of said first and second calibration bursts.

24. The highly bandwidth-efficient communications system of claim 21, wherein said beam steering correction at said base station steers said first and second traffic bursts respectively transmitted from said first and second antenna elements toward said remote station.

25. The highly bandwidth-efficient communications system of claim 21, wherein said beam steering correction at said base station steers said first and second traffic bursts respectively transmitted from said first and second antenna elements to maximize a signal-to-interference-noise ratio (SINR) of said first and second traffic bursts.

26. The highly bandwidth-efficient communications system of claim 21, wherein said means for forming said first calibration burst at said first antenna element comprises:

means for selecting said distinctive orthogonal frequency division multiplexed pattern unique to said base station;

means for computing spreading weights at said base station to spread an outgoing calibration signal over a plurality of outgoing frequencies, using said pattern; and means for spreading said calibration signal over said plurality of outgoing frequencies using said computed spreading weights, thereby forming said first calibration burst.

27. The highly bandwidth-efficient communications system of claim 21, wherein said means for calculating said beam steering correction at said base station comprises:

means for receiving at said base station a spread signal comprising an incoming link control signal that includes said value spread over a plurality of incoming link control frequencies;

means for adaptively despreading said spread signal received at the base station by using despreading weights, recovering said value;

means for deriving from said value said relative phase difference measured between said first and second calibration bursts at said remote station;

means for comparing said derived relative phase difference with a preceding derived relative phase difference measured between preceding first and second calibration bursts at said remote station resulting from a preceding beam steering correction applied at said base station to said preceding first and second calibration bursts;

means for calculating a transmission phase correction to said first and second antenna elements in response to said means for comparing, to minimize a relative phase difference between said first and second traffic bursts at said remote station.

28. The highly bandwidth-efficient communications system of claim 27, wherein said base station is part of a wireless discrete multitone spread spectrum communications system.

29. The highly bandwidth-efficient communications system of claim 27, wherein said calibration bursts are used for link control in said traffic bursts.

30. The highly bandwidth-efficient communications system of claim 27, wherein said means for applying said beam steering correction to said first and second traffic bursts further comprises:

means for computing spreading weights at said base station to spread traffic signals over a plurality of outgoing frequencies, using said calculated transmission phase correction; and means for spreading said traffic signals over said plurality of outgoing frequencies using said computed spreading weights, thereby forming said first and second traffic bursts.

* * * * *